United States Patent [19]

von Nordenskjöld

[11] 4,287,062
[45] Sep. 1, 1981

[54] APPARATUS FOR BIOLOGICAL PURIFICATION OF SEWAGE

[76] Inventor: Reinhart von Nordenskjöld, Ernst-Heinkel-Ring, D-8011 Hohenbrunn, Fed. Rep. of Germany

[21] Appl. No.: 63,046

[22] Filed: Aug. 2, 1979

[30] Foreign Application Priority Data

Aug. 9, 1978 [DE] Fed. Rep. of Germany ....... 2834899

[51] Int. Cl.³ .............................. C02F 3/20; C02F 7/00
[52] U.S. Cl. .................................... 210/199; 210/220; 210/242.2; 261/120; 261/121 R
[58] Field of Search .................... 210/170, 195.3, 197, 210/219, 220, 221 R, 242 A; 261/120, 121 R

[56] References Cited

U.S. PATENT DOCUMENTS

| | | | |
|---|---|---|---|
| 302,326 | 7/1884 | d'Heureuse | 261/120 |
| 1,195,067 | 8/1916 | Mottram | 210/220 X |
| 1,727,601 | 9/1929 | Imhoff | 210/220 X |
| 1,775,942 | 9/1930 | Millmather | 261/121 R |
| 2,417,519 | 3/1947 | Persson et al. | 261/121 R |
| 2,650,810 | 9/1953 | Nordell | 210/220 X |
| 3,033,372 | 5/1962 | Riddick | 210/220 |
| 3,320,160 | 5/1967 | Welles, Jr. et al. | 210/242 A X |
| 3,320,928 | 5/1967 | Smith | 261/121 R X |
| 3,563,383 | 2/1971 | Hellquist et al. | 210/151 X |
| 3,589,997 | 6/1971 | Grutsch et al. | 210/242 A X |
| 3,664,647 | 5/1972 | Snow et al. | 261/120 X |
| 3,883,424 | 5/1975 | Stamblesky et al. | 210/220 X |

FOREIGN PATENT DOCUMENTS

| | | |
|---|---|---|
| 203422 | 5/1959 | Fed. Rep. of Germany . |
| 1246606 | 8/1967 | Fed. Rep. of Germany . |
| 1277159 | 9/1968 | Fed. Rep. of Germany . |
| 2240543 | 12/1973 | Fed. Rep. of Germany . |
| 2324433 | 12/1975 | Fed. Rep. of Germany . |
| 2412543 | 6/1977 | Fed. Rep. of Germany . |
| 460568 | 1/1937 | United Kingdom . |

*Primary Examiner*—Robert H. Spitzer
*Attorney, Agent, or Firm*—Andrus, Sceales, Starke & Sawall

[57] ABSTRACT

This invention relates to apparatus for the biological purification of sewage, comprising at least one active sludge basin having an inlet and an outlet, and a plurality of bottom aerators suspended adjacent one another from a carrier and supplied by an air supply conduit for introducing air into the sewage adjacent the bottom of said basin, said bottom aerators being disposed in said basin for reciprocating movement therein.

26 Claims, 9 Drawing Figures

APPARATUS FOR BIOLOGICAL PURIFICATION OF SEWAGE

BACKGROUND OF THE INVENTION

Disclosed in DE-AS No. 1 277 159 is an apparatus of the type defined in the introduction, in which the basin is a channel-type structure. Basins of this type are usually concrete structures.

For aerating the active sludge contained in the basin, the apparatus is provided with grid-shaped bottom aerators suspended from a bridge structure extending transversely of the channel-type basin. In order to ensure adequate aeration of the active sludge over the full length of the basin, the bridge structure is mounted for reciprocating movement in the longitudinal direction of the channel. It is also suggested to attach the bottom aerators to a float which may be dragged through the basin without being supported by the bridge structure carried by the basin walls.

Basins of this type are constructed as so-called compact installations, but sometimes also as large scale installations. It has become evident, however, that a sufficiently safe control of the active sludge required for the sewage purification can be achieved in an economical manner only, if at all, in the case of the smaller compact installations. In the case of larger installations there is always the danger that the active sludge in certain areas dies off in an uncontrolled manner, leading to unstable conditions in the basin during the purification of sewage.

The smaller installations as well as the larger installations suffer from the disadvantage that their construction and operation are rather expensive. The treatment basins, which in most cases are concrete structures, are expensive to build, and the mechanical installations for moving the bottom aerators and controlling the aeration process are complicated and subject to failure. In addition to high capital investment this results in high operating costs mainly due to high manpower costs.

The high investment and operating costs of an installation of this type frequently lead to several communities forming a joint venture. This, however, necessitates the construction of sewers from the participating communities to the common sewage treatment plant. The costs of such sewers often exceed those of the treatment plant itself.

In view of these disadvantages, large-scale earth basin installations with and without artificial aeration have been developed for plants serving up to about 10,000 PUV (population unit value). Pure earth basins without artificial aeration have conventionally been built only for a few hundred PUV. In these basins there prevail undefined decomposition conditions between aerobic and anaerobic areas, so that an active sludge in the usual sense cannot develop. Since the absorption of oxygen takes place only at the surface, installations of this type have to have a very large surface area, and their operation in winter is unsatisfactory. The dwelling time of the sewage in these installations is usually 30 days and above.

The installations developed from such earth basin installations and provided with line aerators or other devices, such as spot aerators, permitted to reduce the surface area requirements, they are still suffering, however, from ill defined conditions as concerns their operation, resulting in dwelling times of domestic sewage of 10 to 20 days in the aerated sector, and of up to 30 days in the installation as a whole. In installations operating under higher load one has to accept extremely long dwelling times again requiring excessively large installations. While aerobic conditions prevail in certain areas of these installations, they are not controllable, and areas with anaerobic conditions cannot be avoided.

SUMMARY OF THE INVENTION

It is an object of the invention to provide an apparatus as defined in the introduction, which is inexpensive as to construction and operation and permits safe control of the sewage purification by means of the active sludge.

In order to attain this object the invention provides that the bottom aerators are connected to at least one flexible carrier extending over the basin in such a manner that the bottom aerators together with the carrier are periodically driven back and forth transversely of the longitudinal extent of said carrier by the air exiting therefrom adjacent the bottom.

The apparatus according to the invention is of simple construction and provides the possibility of an inexpensive fully biological sewage purification. The apparatus is not restricted to basins of predetermined size and/or shape. The advantages of the invention are more effectively exploited, however, in large basins, since on the one hand a greater container and therefore buffer volume is available, and on the other hand, the fully biological purification can be safely and easily controlled with the apparatus according to the invention. Independent of their size and shape, the basins can be constructed as simple earth basins with a greater or lesser degree of strengthening. This results in considerable savings by comparison to the conventional expensive constructions. In addition, the apparatus according to the invention may be enlarged without major difficulties, as long as there is space available, either by enlarging the existing earth basins in a very short time, or by adding further earth basins to the installation. Large basins also offer the advantage that even strong fluctuations of the sewage amount, contaminant loading, content of sediment substances and pH value can be evened out.

The apparatus according to the invention requires only a very small energy input for the basin aeration. The bottom aerators are series-connected in the manner of a chain and are periodically driven back and forth over a certain operating range by the air exiting therefrom adjacent the bottom. The range of operation depends on the length and construction of the aerator chain. If the chain is kept under some tension, its range will be smaller than in the case of some slack in the chain. The back and forth movement of the aerator chains results in a strong agitation of the sewage and the active sludge contained therein over large areas. By the introduction of the air in the form of small bubbles the sludge is on the one hand nourished and thus kept alive, while on the other hand being prevented to settle on the bottom for longer periods. Depending on the arrangement and construction of the aerator chains the sludge may well rest on the basin's bottom for short periods. The back and forth movement of the aerator chains assuredly prevents the sludge, however, to rest on the bottom for a sufficiently long period that it might die off.

The introduction of the air in the form of small bubbles results in a great volume of the sewage being aerated, which has a favorable effect on the maintenance of the active sludge. In addition, the small bubbles rise very slowly, so that their dwelling time in the sewage to be purified is extended.

The periodical movements of the aerator chains results in a uniform treatment over the entire basin area. Between the stationary points at which the carriers are anchored the chains may assume any shape, e.g. an arcuate or serpentine configuration. It has been found that adjacent aerator chains will after some time harmonize their movements so as to move back and forth more or less in unison.

The periodical back and forth movement of the aerator chains offers the advantage that after each reversal of their movement the chains will move through basin areas in which the active sludge has already absorbed the previously introduced oxygen, so that there exists a certain oxygen deficiency in the respective zones, enabling the newly introduced oxygen to be readily absorbed. With respect to the oxygen absorption it is also advantageous to employ a large basin in connection with the apparatus according to the invention, since a large surface area of the sewage permits the direct absorption of considerable amounts of oxygen.

As mentioned above, the basins may be constructed as simple earth basins, which in combination with the aeration method according to the invention results in low investment and maintenance costs. There is also the possibility of increasing the capacity of an existing installation without enlarging the basin or basins by providing the aerator chains with additional bottom aerators.

Depending on the configuration of the basin and the range of operation of each aerator chains, the ends of the chains may be anchored at fixed points within the basin or outside thereof. For providing the aerator chains with a larger range of operation, their ends may not be anchored at fixed point, but may instead be movably attached to guide means preferably extending transversely of the longitudinal direction of the carrier so as to enlarge the lateral movement range of the aerator chains. The guide means may for instance comprise wire ropes extending transversely of the longitudinal direction of the carrier, the carrier being slidably and eventually releasably connected thereto by means of hooks, eyelets or the like. The anchoring points of the carrier may also be located on carriages adapted for movement transversely of the longitudinal direction of the carrier and possibly guided on rails. Since the aerator chains are not only free to move laterally, i.e. in the direction of the water level, but may also be supported between their anchoring points so as to be variable in the vertical direction, the apparatus according to the invention offers the possibility to vary the water level within the basin without the necessity of adjusting the aerator chains to different water levels. This adjustment occurs automatically, since the floating aerator chains will always adapt their height to the water level.

In order to be able to vary the range of operation of the aerator chains, at least one end of the respective carriers may be provided with a length of link chain the links of which may be selectively connected to the respective anchoring point so as to vary the free length of the aerator chain and thus its range of operation.

The air introduced by means of the aerator chains is also effective to set up extensive circulations in the surrounding water volume. The air exiting from each bottom aerator adjacent the basin's bottom promotes an upwards directed movement of the water above the point, or points of exit. The so created currents diverge laterally adjacent the liquid surface and are then directed downwards and inwards due to the suction effect of the outflowing and rising air. In the case of bottom aerators with elongate air exit areas this leads to the creation of substantially cylindrical circulation currents on both sides of the aerator, which may attain a width of up to 5 meters or more on each side. These circulation currents will also be effective adjacent the borders of the basin, thus preventing the formation of dead anaerobic zones in these areas.

The apparatus according to the invention offers all the necessary conditions for a natural purification of the sewage by the active sludge. The active sludge is offered ideal living conditions and is thereby enabled to fully perform its role in the sewage purification. The biocynosis can freely develop. The back and forth movement of the aerator chains ensures that the active sludge is adequately nourished by the introduced oxygen and prevented from settling on the basin's bottom for longer periods. In the case of a sufficiently large basin, the danger of the entire installation dying off is considerably reduced. Even if in case of extremely high loading a portion of the basin should die off, this would not lead to the same consequences as in known purification plants which in this case have to be completely cleaned and then carefully reactivated. The apparatus according to the invention permits the active sludge in a died-off portion of the basin to be regenerated without the necessity of completely emptying the basin and subsequent reactivation.

Adjacent the outlet of the apparatus according to the invention there is provided a quiescent or calmed zone which is not swept by the bottom aerators. This is of particular advantage in the case of large basins. Located in the calmed zone is the intake portion of the generally known sludge recirculation duct serving to selectively recirculate active sludge to the inlet of the basin. In this manner the arriving sewage may be inocculated with active sludge adjacent the inlet, so that the biological purification is already started adjacent the inlet and the formation of an active sludge deficient zone in this area is prevented. The back and forth movement of the aerator chains also provides for sufficient agitation and aeration of the arriving sewage adjacent the inlet. Due to the introduction of the air in the form of small bubbles the arriving sewage is thoroughly mixed with the recirculated sludge. By comparison to known installations these rather simple provisions of the apparatus according to the invention ensure a stable aerobic purification of the sewage while offering the added advantage of reduced capital investment and operating costs.

In an advantageous embodiment the invention provides that each bottom aerator has a vertical connecting tube connected at its upper end to the carrier for oscillating movement about the longitudinal axis thereof, and connected at its lower end to a tubular manifold provided with air exit openings and extending parallel to the carrier.

This construction of the bottom aerators is effective to enhance the self-induced back and forth movements of the aerator chain. This movement is brought about by at least one bottom aerator being tilted from its vertically depending position as under the influence of waves or the outflow of air therefrom. The force resulting therefrom tends to push the respective section of the aerator chain sideways, whereby the remaining bottom aerators are also tilted to a slightly oblique position so as to enhance the lateral movement.

For facilitating the oscillating movement of the bottom aerators, they are preferably provided adjacent their upper ends with a float extending along the longitudinal axis of the carrier.

In a further advantageous embodiment the invention provides that the carrier is formed by the air supply conduit. This conduit is then fully able to resist the tensional and possibly torsional forces acting on the carrier so as to perform the carrying function thereof.

Similarly the air supply conduit may also form the float. In this manner the air contained in the conduit is employed for the floating support of the bottom aerators.

In a further advantageous embodiment of the invention the outlet is formed as a controlled-flow floating overflow. An overflow of this type permits the amount of water flowing from the first basin onwards to the second basin to be adjusted to a constant value independent of the amount of the arriving sewage. Even a sudden increase of the sewage inflow caused for instance by a cloudburst, will not cause uncontrolled overflow into the second basin, since the floating overflow rises and falls with the varying water level. By properly dimensioning the treatment basins it is thus possible to eliminate a separate rain catchment basin.

In order to ensure proper sludge removal the basin is preferably provided with a sludge collector trough located in an area remote from the inlet and having the intake portion of the sludge recirculation duct located adjacent its bottom.

The floating overflow leading to the next basin is preferably located above the sludge collecting trough and is preferably separated from the main portion of the basin by a floating partition. The floating partition is effective to create a quiescent water surface adjacent the outlet, so that the sludge is able to settle in the collecting trough. The floating partition thus promotes the sedimentation of the sludge.

In another advantageous embodiment the invention provides that the sludge collecting trough has a V-shaped cross-section with legs of different length, the bottom portion of said trough containing the intake portion of the sludge recirculation duct extending at a lower level than the bottom of the basin and being connected therewith by the shorter leg of said V-shape. The positioning of the trough bottom at a lower level promotes the flow of the sludge to the recirculation duct. During its movement towards the sludge collecting trough, the sludge is in any case deflected downwards by the floating partition. Since the sludge adjacent the collecting trough is no longer agitated by the bottom aerators, it settles down in this area and is concentrated in the trough.

If the sludge tends to compact excessively it may be advantageous to provide a sweeping device above the sludge collecting trough for sweeping the trough and the intake openings of the sludge recirculation duct.

Similarly, air exit openings may be provided adjacent the sludge collecting trough for aerating and fluidizing the collected sludge. The aeration and fluidization of the collected sludge prevents the sludge from dying off the compacting excessively.

The invention thus provides all requirements necessary for keeping the active sludge employed for the biological purification alive and for improving its functions. The sludge collecting trough provided in the quiescent zone adjacent the outlet plays an important role in this context. The sewage containing the active sludge drifts slowly in the direction of the sludge collection trough, where the partition suspended vertically in the water is effective to cause further quieting of the sewage. The water and the sludge pass underneath the partition, as the latter extends upwards to the height of the water level. The intake portion of the sludge recirculation duct is located at the bottom of the collecting trough. The active sludge is taken in through the intake openings as required for return to the basin inlet. If no further active sludge is required at the inlet, the collected sludge may be whirled up by actuating the air exit openings for conveyance towards the outlet. In this manner it is possible to relieve an undesired sludge concentration. The flow-through capacity of the outlet is adjustable, so that the water level within the basin may be arbitrarily selected. Suitable control of the aerator output, of the back and forth movement of the aerator chains, of the magnitude of sludge recirculation and of the flow capacity of the outlet offers so many possibilities for the control of the active sludge contained in the basin that the sludge can readily perform its role in the biological purification of the sewage.

The sludge collecting trough according to the invention is of simple construction and is thus a very inexpensive and effective alternative to the settling basins required in conventional installations.

In view of the back and forth movement of the aerator chains and the agitation of the water surface resulting therefrom, the sludge collecting trough is advantageously disposed transversely of the longitudinal direction of the carrier and located in a quiescent zone of the base not swept by the bottom aerators.

In a further advantageous embodiment of the invention, the sludge recirculation duct may be provided with an air injector acting as a pump for conveying the active sludge towards the inlet and for simultaneously aerating the conveyed sludge.

Embodiments of the invention shall now be described with reference to the accompanying drawings, wherein:

DESCRIPTION OF THE PREFERRED EMBODIMENT

Figure 1:
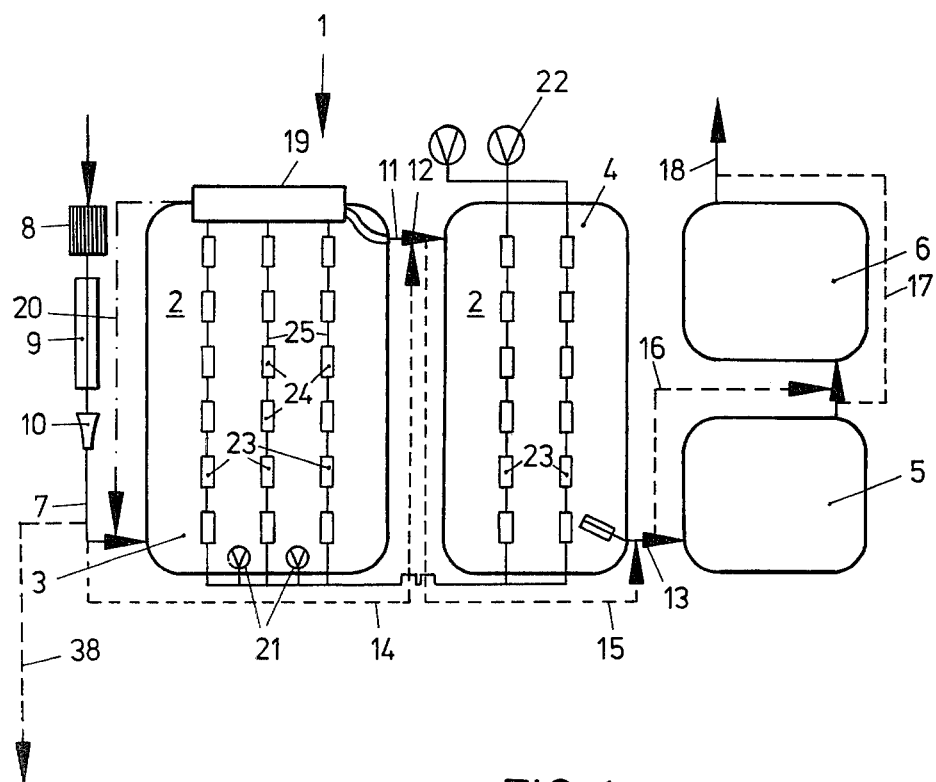
FIG. 1 shows a diagrammatic top plan view of an apparatus according to the invention.

FIG. 1 of the drawings shows an apparatus 1 for the biological purification of sewage 2. The apparatus shown includes a basin 3 for performing a first biological purification step, a basin 4 for performing a second biological purification step, a sludge settling basin 5 and a storage basin 6. The sewage to be treated arrives via an inlet duct 7 provided with a preferably automatic grating 8, a sand catcher 9 and a venturi channel 10, and from which a rain relief duct 38 is led off.

The basin 3 as well as the succeeding basin 4 are of rectangular shape and relatively large size. All basins are formed as reinforced earth basins. The basin 3 has its sewage inlet adjacent one end of a long side, and its outlet 11 diagonally opposite the inlet at the other end of the other long side. The outlet 11 of the basin 3 is connected by a short duct to the inlet 12 of the second basin 4, with the outlet 13 thereof again being located diametrically opposite the inlet 12. The same applies to the succeeding basins 5 and 6 which also have their inlets and outlets located diagonally opposite one another.

A conduit 14 for by-passing the basin 3 extends from the inlet duct 7 thereof to the inlet 12 of basin 4. A further conduit 15 for by-passing the second basin 4 extends from the inlet 12 to the outlet 13 thereof. Still another conduit 16 for by-passing basin 5 extends from outlet 13 to the duct connecting basins 5 and 6. A final conduit 17 for by-passing basin 6 leads from the connection between basins 5 and 6 to the outlet 18 of the latter.

In the embodiment shown, only the first basin 3 is provided with a sludge collecting trough 19 located away from the inlet 7 at a short side of basin 3 and thus in the immediate vicinity of outlet 11. The sludge collecting trough 19 communicates with the inlet duct 7 by way of a sludge recirculation duct 20.

Provided adjacent the short side of basin 3 proximate the inlet 7 thereof are submerged blowers 21 for supplying air to aerator chains 23 to be described later. Similar submerged blowers may also be provided at the short side of the second basin 4 adjacent the inlet 12 thereof. The submerged blowers may be replaced, however, by a central blower station 22 for supplying air to the aerator chains 23 of both basins 3 and 4. The first basin 3 is of greater width than the second basin 4 and therefore provided with three aerator chains 23 extending thereover in spaced relationship to one another substantially parallel to the long sides of the rectangular basin. Each aerator chain 23 comprises a number of bottom aerators 24 suspended in longitudinal alignment from a flexible carrier 25, the ends of which are attached to fixed anchoring points 44. The carrier is guided over the basin and anchored inside or outside thereof in such a manner that the bottom aerators together with the carrier are able to perform a periodical back and forth movement transversely of the longitudinal extent of the carrier. This back and forth movement is clearly shown in FIG. 5. In this figure the aerator chains 23 have adopted a serpentine configuration under the influence of their arbitrary movements. The movements of the aerator chains 23 are only limited by the length of the respective carrier and the amount of slack between its two ends attached to the fixed anchoring points 44. By suitably dimensioning the carrier it may be ensured that the aerator chains sweep the basin over its full extent. After a certain time of operation, the aerator chains will usually move back and forth in unison.

Figure 2:
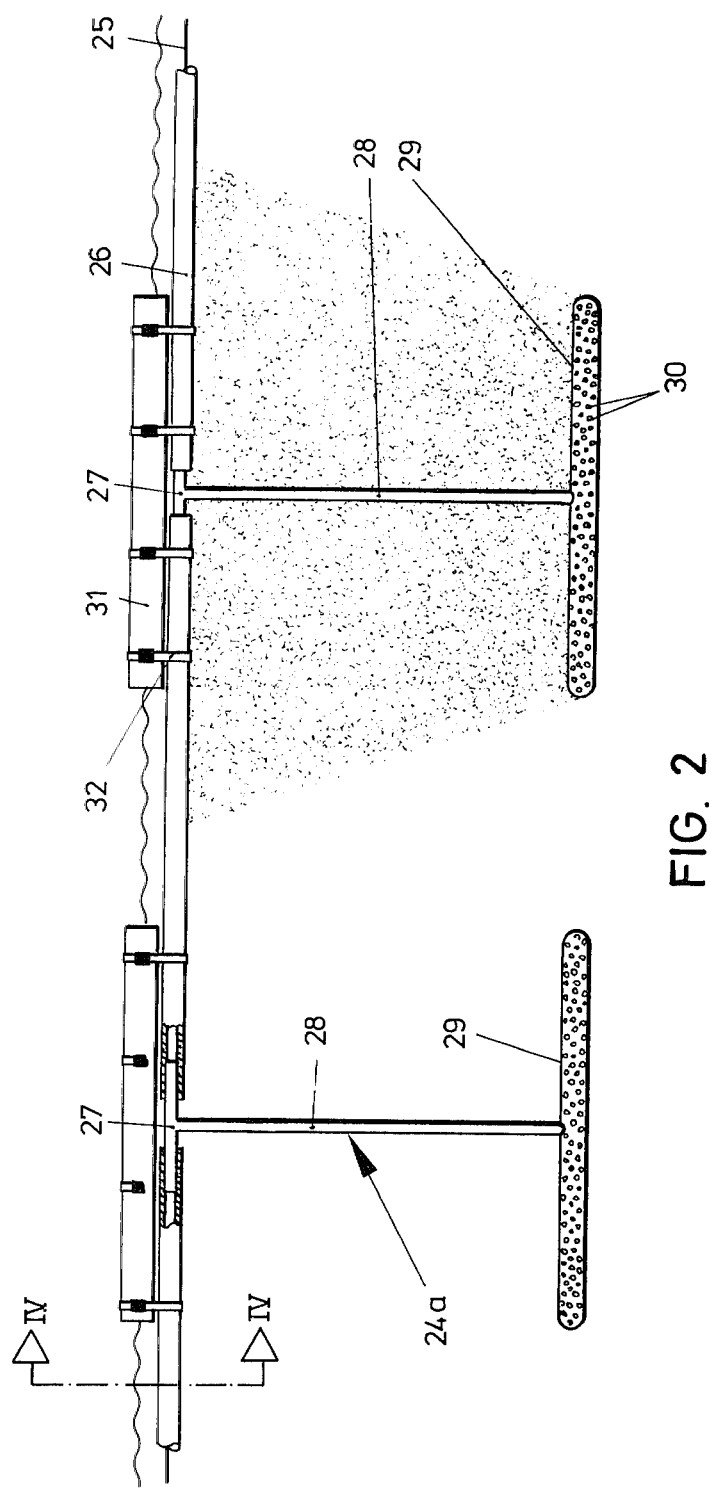
FIG. 2 shows a side view of an aerator in a first embodiment.
Figure 3:
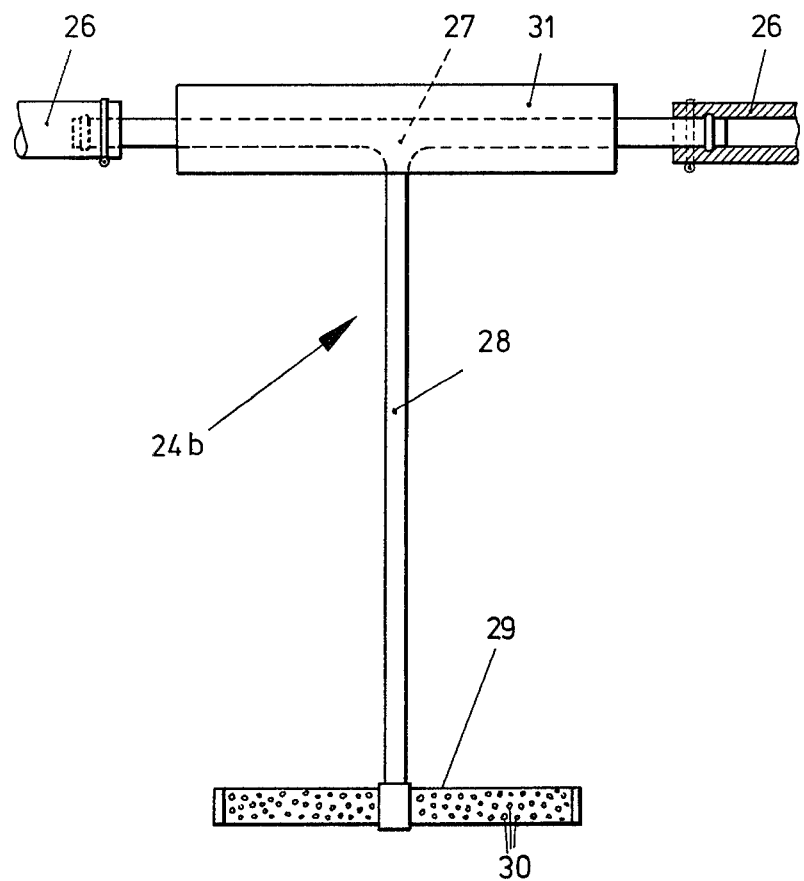
FIG. 3 shows a side view of an aerator in a second embodiment.

FIGS. 2 and 3 show two different embodiments of bottom aerators 24a and 24b, respectively. The bottom aerator 24a of FIG. 2 is suspended from a carrier 25 shown as a rope in this embodiment. Rope 25 extends with a greater or lesser amount of slack between fixed anchoring points 44. An air supply conduit 26, usually in the form of a hose, extends along rope 25. Conduit 26 is divided into sections extending between individual bottom aerators 24, the adjacent ends of two sections being joined by a T-shaped tube member 27 inserted therein. Connected to the stem of the T-shaped member 27 is a connecting tube 28 extending substantially vertically downwards. At its lower end, connection tube 28 communicates with a tubular manifold 29 extending parallel to carrier 25 and provided with a plurality of air exit openings 30 around its periphery. Pressurized air supplied to manifold 29 via supply conduit 26 and connecting tube 28 exits therefrom through openings 30. Associated with each bottom aerator 24a is a float 31 extending along the axis of carrier 25 for floatingly supporting the respective aerator. Air supply conduit 26, carrier 25 and bottom aerator 24a are attached to float 31 by means of conventional fasteners such as clamping ties 32.

Figure 4:
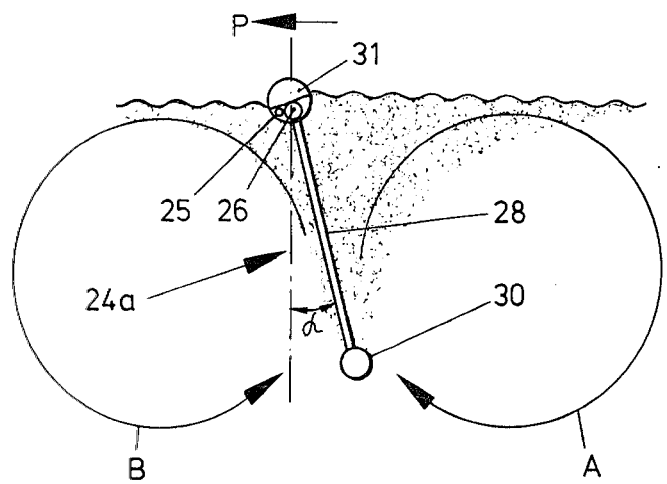
FIG. 4 shows a cross-sectional view of an aerator chain tilted from its vertically suspended position.

FIG. 4 shows the manner in which the lateral movement of an aerator chain is brought about by the tilting of a bottom aerator 24a about an angle $\alpha$. The expulsion of pressurized air through the openings of manifold 29 results in a small resulting force in the direction of arrow P. This force initiates movement of the bottom aerator in the direction of arrow P, whereby the adjacent bottom aerators are also tilted from their substantially vertically suspended position. As a consequence, the entire aerator chain will start to drift laterally. It is to be noted, however, that the aerator chain is by no means constrained to move in one and the same direction over its full length at any given time. Quite to the contrary, each aerator chain is subjected to the free play of forces, so that it will move back and forth within its range of movement generally periodically, albeit in an arbitrary manner within the limits defined by its carrier.

The air exit openings 30 of manifold 29 are sufficiently small, so that the air is expelled therefrom in the form of small bubbles. The expelled air bubbles rise substantially vertically through the liquid as shown in FIG. 4. The upward movement of the air bubbles results in the formation of a slight elevation of the liquid surface above the manifold 29. This elevation enhances the already initiated drifting movement of the aerator chain.

The upward movement of the expelled air above the manifold 29 further results in the formation of a substantially circular flow on both sides of the bottom aerator as indicated by arrows A and B in FIG. 4. This movement takes the form of a substantially cylindrical circulation. When the bottom aerator is at a location close to the basin's edge, this circulation will adapt its shape to that of the marginal area of the basin.

The construction of aerator 24b is substantially similar to that of aerator 24a. Corresponding parts are therefore designated by the same reference numerals. As shown in FIG. 3, the T-shaped member 27 of aerator 24b is extended beyond float 31 and has its projecting ends connected to the air supply conduit. The float 31 is a cylindrical foam material body coaxially surrounding the central portion of T-shaped member 27 and formed directly therearound for being fixedly attached thereto. The air supply duct 26 is formed by a hose or tube dimensioned such that it also serves as the carrier, so that a separate carrier 25 as in FIG. 2 is not required in this embodiment. The connections between the sections of the air supply conduit and the individual bottom aerators are sufficiently strong, so that they cannot be separated by wind and water forces and the air supply duct is fully capable of taking over the function of the carrier 25. In both embodiments described, the connections are designed so that the bottom aerators are free to oscillate about their vertically suspended position in order to enable the aerator chains to perform their above described drifting movement.

Figure 6:
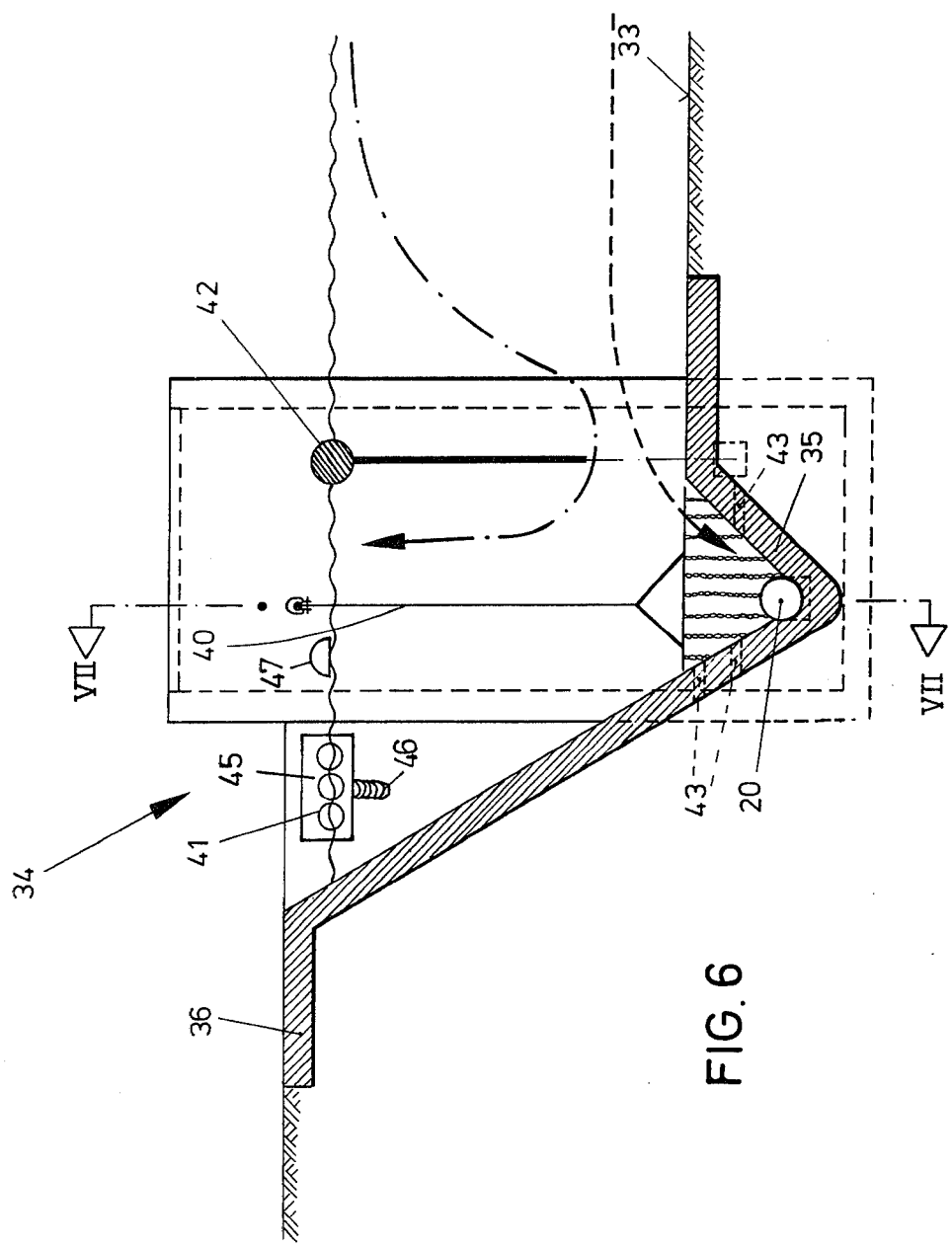
FIG. 6 shows a cross-sectional view of a sludge collecting trough.
Figure 7:
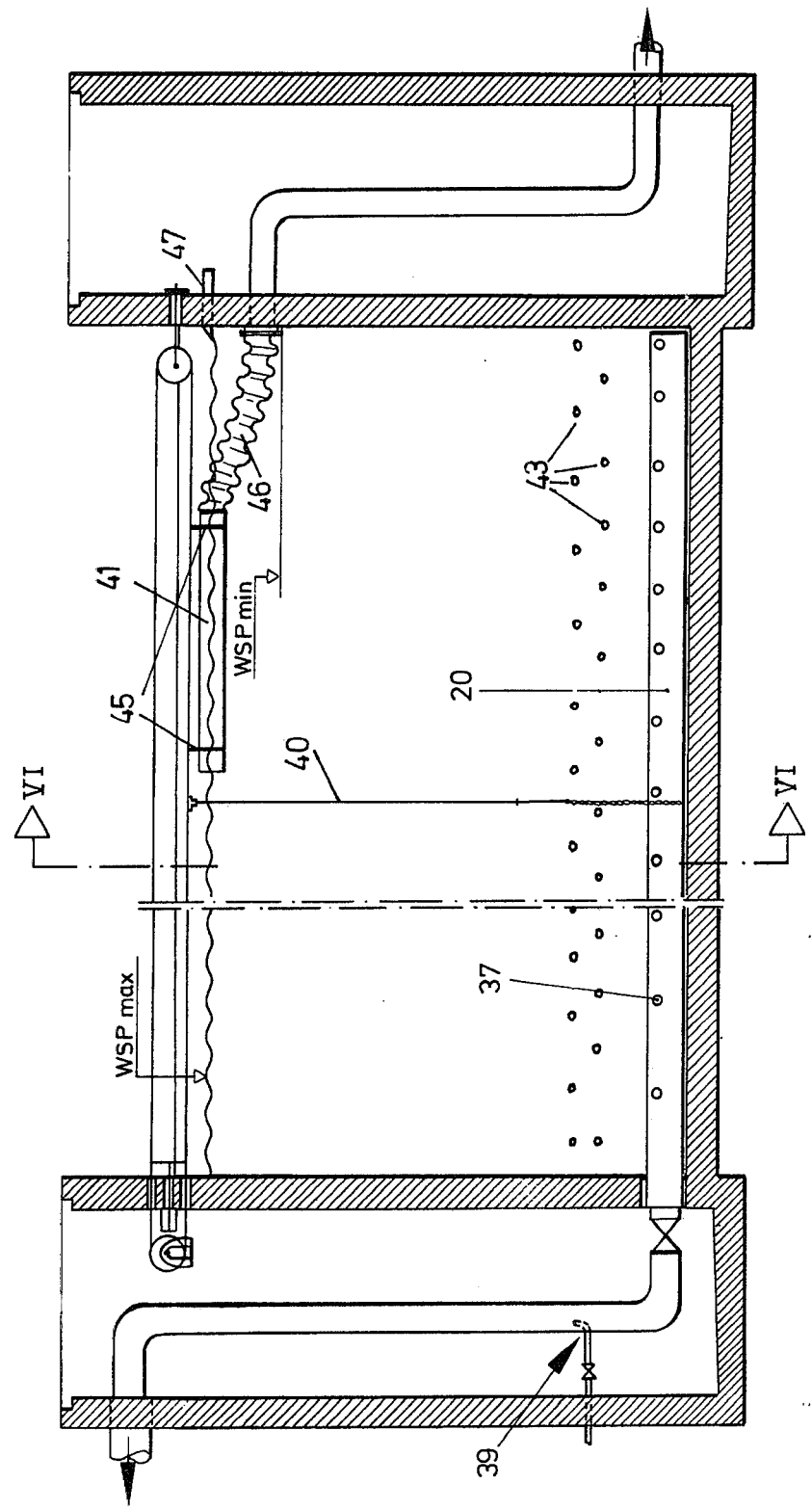
FIG. 7 shows a longitudinal sectional view of the sludge collecting trough.

FIGS. 6 and 7 show in detail the portion of basin 3 adjacent the outlet 11 thereof. As seen in FIG. 6, basin 3 has a bottom 33 and contains partially purified sewage 2. The end of basin 3 is formed over a substantial portion of its width by a sludge collecting trough 34 of substantially V-shaped cross-sectional profile having two legs of different length. The bottom of trough 34 extends at a lower level than the bottom 33 of basin 3 and is connected thereto by the shorter leg of its V-shaped profile. The longer leg is extended upwards beyond the liquid level and merges with the basin rim 36. Disposed at the bottom of trough 34 is the already mentioned sludge recirculation duct 20. The portion of duct 20 located in trough 34 is provided with openings 37 for the intake of sludge. Beyond a lateral end of the sludge collecting trough, recirculation duct 20 extends upwards to a point above the highest liquid level from where it leads back to the inlet 7. Duct 20 is provided with a pump for simultaneously conveying and aerating the recirculated sludge. The pump is designed in the usual manner as an air injector 39.

Above the bottom of trough 34 there is provided a sweeping device comprising a sweeper chain assembly 40 mounted for back and forth movement along the trough. The lower end of chain assembly 40 is dragged along the bottom and walls of the sludge collecting trough for loosening the collected sludge. The upper end of chain assembly 40 is attached to a pulling cable extending over the full length of the sludge collecting trough between sheaves and driven by a motor for continuous reciprocating movement.

Above the trough there is further provided a floating overflow assembly 41 consisting of three juxtaposed tube members. The two outer tube members are designed as floats. Their end portions are interconnected by means of vertical wall members 45 which also retain the central tube member acting as the outlet proper. The floats and vertical connecting wall members together are effective to prevent the entry of any floating objects into the outlet which might otherwise be obstructed thereby. The outlet itself is of very simple design. The central tube member is mounted in the wall members so as to be rotatable about its axis. Its peripheral wall is provided with inflow openings arranged for instance in a steep helical pattern. By turning the tube member, a greater or smaller number of inflow openings are positioned below the liquid level for correspondingly adjusting the flow rate of the outlet. A flexible conduit 46 connects the central tube member of the floating outlet assembly with a rigid outlet duct fixedly mounted at the respective end of the sludge collecting trough. The height of the fixed outlet duct determines the lowest liquid level within the basin, so that no more liquid will enter the floating outlet assembly when the liquid level falls below the height of the outlet duct. The maximum height of the liquid level is limited by an emergency overflow outlet 47.

Between the sludge collecting trough and the main portion of the basin there is provided a floating partition 42 effective to create a steady flow towards the trough by deflecting the sewage and the active sludge suspended therein downwards, whereupon the sludge settles in the collecting trough and the water flows upwards to the floating outlet assembly. The vertically suspended partition extends over the entire length of the sludge collecting trough and is of variable height while being retained against horizontal movement in a manner not shown. Excessive compaction of the collected sludge may be prevented by air exit openings 43 adjacent the bottom of trough 34 for aerating and fluidizing the collected sludge.

The apparatus according to the invention operates as follows: The sewage to be purified is introduced into basin 3 via inlet duct 7. A pre-treatment is usually not required. The active sludge purification process takes place in basin 3. The entire volume of the sewage in basin 3 together with the substances suspended therein is kept in continuous circulation by the back and forth drifting movement of the suitably arranged aerator chains 23, and is simultaneously aerated in the form of small bubbles. The aeration system operates at a very low energy input and can be adapted to any basin shape and liquid levels of up to about 4 m. On the basis of a basic load, the air supply is automatically controlled in response to the selected oxygen demand, or may be semiautomatically controlled by means of suitably set timing switches or the like. If the momentary load falls by about 40% below the basic load, the circulation caused by the reduced air input is no longer sufficient to keep solid matter such as potato peels in suspension. Under these conditions, the timing switches or similar devices may be set to increase the air input to full load conditions for a period of 1 to 3 minutes at about 60 minute intervals.

If several blowers are provided, one of them may be kept in continuous operation to ensure the basic load air input, while the remaining blowers may be activated on demand for increasing the oxygen supply.

In FIG. 1 of the drawing, the aerator chains 23 in the first basin 3 have only one of their ends connected to the pressurized air supply represented by blowers 21 or 22. If the pressurized air supply to the aerator chains from only one end thereof turns out to be insufficient, it is also possible to provide for supply at both ends as shown in the case of the second basin 4.

Due to the basic drift from the inlet to the outlet, the sewage moves slowly in the direction towards the outlet together with the active sludge suspended therein by the continuous action of the introduced air.

The sewage arriving at the inlet has already been inoculated with active sludge via the sludge recirculation duct 20, so that a uniform and stable aerobic purification of the sewage is already initiated adjacent the inlet. The continuous oxygen input via the bottom aerators prevents the active sludge from dying off.

At the end of the basin, a suitable proportion of the sludge is caused to settle by the effect of the partition, whereupon the settled sludge is conveyed from the collecting trough to the inlet by means of the sludge recirculation duct 20. Any sludge adhering to the walls of the sludge collecting trough will be mobilized by the sweeping chain assembly 40. Excessively concentrated or compacted sludge may be fluidized by introducing air through the openings 43, so that it flows into the succeeding basin 4 via the floating outlet assembly together with the remainder of the sewage. The flow rate through the floating outlet assembly is adjustable, so that a controlled overflow into the next basin 4 is achieved independent of the inflow.

On attaining the desired sludge content in basin 3, the operation of the mammoth pump 39 in the sludge recirculation duct may be temporarily interrupted, whereupon it may become necessary to remove the excess of the subsequently collected sludge via the floating outlet assembly 41. This permits close control of the sludge content within basin 3. A similar floating outlet assembly 41 may also be installed in the succeeding basins, so that the basins are in communication with one another and have a great buffer volume.

The floating suspension of the aerator chains as well as of the outlet assembly enables basins 3 and 4 to accommodate level fluctuations of up to 0.5 meters. This buffer capacity can render superfluous a separate treatment and/or storage of rainwater. The particularly dirty water arriving at the beginning of a rainfall can be safely introduced into the plant, whereafter the remainder may be led off via the rainwater relief drain 38.

The apparatus according to the invention may also be provided with a floating inlet assembly the construction of which may be similar to that of the floating outlet assembly 41. The central tube member is of different design, however. It is formed as an open channel communicating at one side with the inlet duct and comprising a wall with a restricted through-opening at its end opposite the inlet duct. The size of the restriction is selected such that the normal sewage inflow can pass therethrough. An excess of incoming sewage will flow into the basin over the walls of the open channel. Thanks to its floating suspension, the inlet assembly is able to adjust itself to the fluctuating height of the liquid level. To this effect it is connected to the inlet duct via a flexible conduit. This arrangement prevents any backflow from the basin towards the rain relief drain to take place as in conventional installations when the increased inflow diminishes. This backflow is particularly undesirable, since in the case of sudden rainfall for instance not only the rainwater would be led off via the relief drain, but also the sewage contained in the basin, as is the case with known installations.

In the following discussion, the abbreviation DS signifies dry substance, BOD stands for the biological oxygen demand, and COD for the chemical oxygen demand.

The apparatus according to the invention permits to achieve sludge contents of 0.5 kg DS/m$^3$ and above, resulting in dwelling times of domestic sewage of 5 to 7 days in basin 3 after stabilization at 0.06 BOD$_{5/kg\ DS}$ sludge loading. For particularly polluted sewage the sludge content is increased. The excess sludge carried over to the next basin 4 together with the overflowing water is completely stabilized in this basin and kept in suspension by the aerator chains 23 also provided in this basin, so that after passing through basin 4 it is finally carried over into the settling basin 5, where it precipitates and is then stored under water for 1 to 3 years. The sludge concentration under the influence of gravity and the final decomposition taking place in this basin reduce the sludge amount to only about 0.2 liters/PUVd. The sludge that is finally removed from one of the post-treatment basins annually or after a period of several years, is odorless and bacteriologically unobjectionable, so that it may be safely used for agricultural purposes.

The second basin 4 is likewise designed with a view to stabilization. Sludge concentrations of 0.2 to 0.5 kg DS/m$^3$ are attainable. With a maximum biological residue loading of 25% the dwelling times for domestic sewage are in the order of 2 to 3 days. The apparatus according to the invention is also very intensive with respect to COD. This is due on the one hand to the relatively long dwelling time in comparison to compact installations, and on the other hand, to the adaptation of the biocynosis to the stepwise progressing decomposition.

Figure 8:
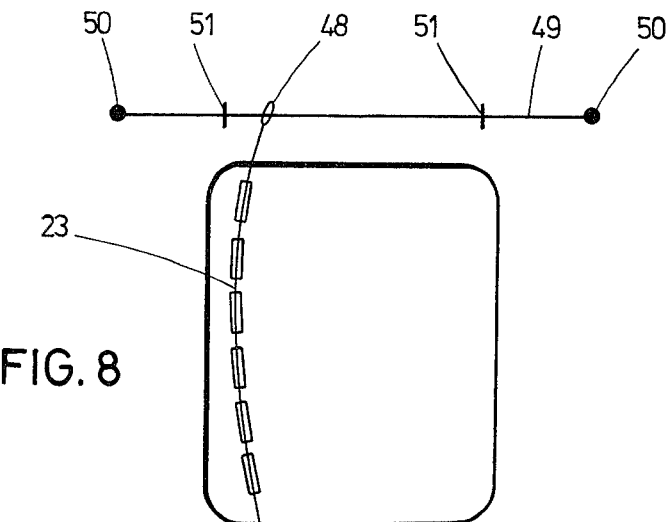
FIG. 8 shows a top plan view of a treatment basin provided with a single aerator chain mounted on lateral guide means for back and forth movement over the full width of the basin.

FIG. 8 shows a treatment basin having a single aerator chain 23 carrying an eyelet 48 at each end. The eyelets are guided on guide ropes 49 each extending between two anchoring points 50 at opposite ends of the basin transversely of the longitudinal extent of the aerator chains. The guide ropes 49 may be provided with stops 51 for limiting the back and forth movement of the aerator chain. This enables the aerator chain to drift over the full width of the basin.

Figure 9:
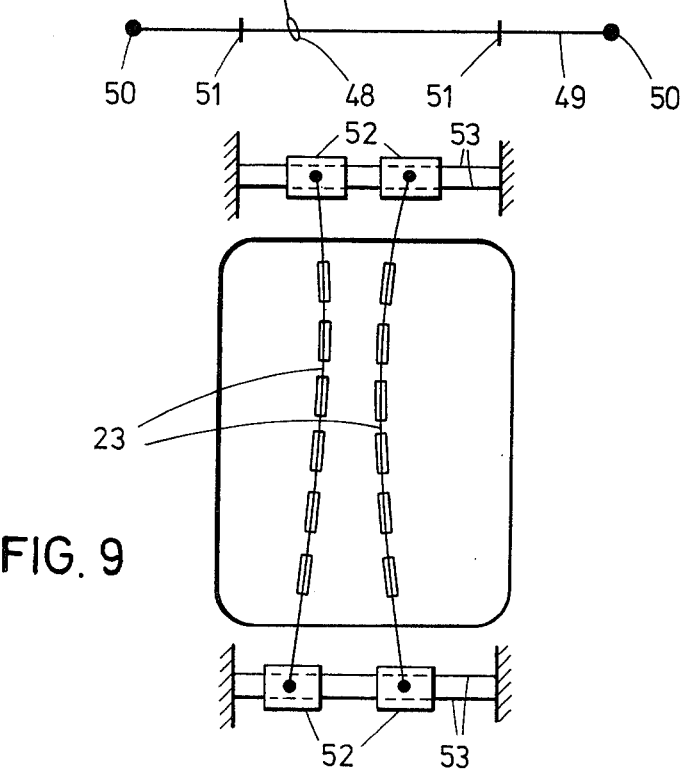
FIG. 9 shows a top plan view of a treatment basin provided with two aerator chains attached to carriages movably guided on rails.

FIG. 9 shows an embodiment employing two aerator chains 23, the ends of which are each attached to a carriage 52 movably guided on rails 53 extending transversely of the longitudinal extent of the aerator chains. A pair of rails 53 is provided at each of two sides of the basin, the carriages being provided with wheels enabling them to move along the rails in the manner of railway carriages. In the embodiments shown in FIGS. 8 and 9 the aerator chains need not be driven to effect their back and forth movement, since the air exiting from the bottom aerators will cause the aerator chains to drift over the basin. The driving force exerted by the aerator chains themselves is sufficient to overcome the friction caused by the connection of the aerator chains to the guide ropes 49 or the carriages 52, respectively, i.e. to cause the carriages shown in FIG. 9 to move back and forth.

A non-stationary attachment or guidance of the aerator chains may also be achieved in another manner, such as by means of guide arms pivotably about vertical axes. It is also possible to provide a combination of movable and stationary anchoring points for the ends of the aerator chains. In this case, one end of an aerator chain would be anchored at a fixed point, while the other end would be free to travel along a guide rope or the like. In this manner it would be possible to aerate basins of triangular or similar shape.

In the embodiment of FIG. 9, the range of movement of the carriages 52 is limited by stop means at the ends of the rails. Since the fixing points for the aerator chains are located substantially at the center of the respective carriages, each aerator chain has its own range of movement within which to drift back and forth. This is of particular advantage when the aerator chains approach one of the margins of the treatment basin or one another.

Figure 5:
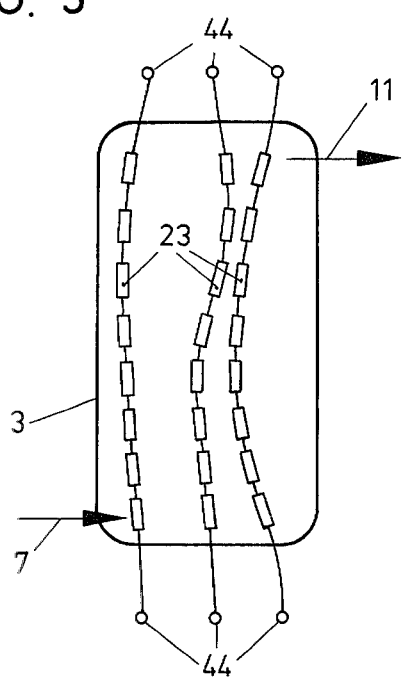
FIG. 5 shows a top plan view of a treatment basin including three aerator chains shown at different stages of their back and forth movement.

The explanations given above with respect to FIG. 5 also apply to this embodiment, that is, the back and forth movements of the aerator chains will attain a state of unison after a certain time. Even if this should not be the case, it would not greatly matter, since the two aerator chains on approaching one another will reverse their direction of movement at their meeting point and start to drift apart. In this manner it is ensured that the entire surface of the basin will be swept in any case.

It is not either necessary to synchronize the two carriages 52 associated with any one aerator chain, since this synchronization will be brought about by the aerator chain itself. Even if the two carriages of one aerator chain were to move in opposite directions, the forces exerted by one portion of the aerator chain will prevail over the forces exerted by another portion so as to reverse the direction of movement thereof.

I claim:

1. Apparatus for the biological purification of sewage by aerobic treatment with active sludge comprising:
at least one basin (3) for receiving the sewage and having an inlet and an outlet; and
aeration means mounted in said basin, said aeration means including at least one elongated flexible carrier (25) extending across said basin, said carrier lying generally proximate the exposed upper surface of the sewage and having a predetermined amount of longitudinal slack therein, and a plurality of bottom aerators (24) suspended at spaced intervals along said carrier into proximity with the bottom of said basin, said aerators being coupled to an air supply conduit for discharging aerobic treatment air into the sewage and propelling said aeration means by the discharge of the air in a reciprocal motion transversely of the extension of said carrier.

2. Apparatus according to claim 1, characterized in that each bottom aerator (24) has a vertical connecting tube (28) connected at its upper end to said carrier (25) for oscillating movement about the longitudinal axis of said carrier, and connected at its lower end to a tubular manifold (29) provided with air exit openings (30) and extending parallel to said carrier.

3. Apparatus according to claim 2, characterized in that each bottom aerator includes a rigid section (27) of said air supply conduit rigidly connected to said connecting tube, and that a plurality of bottom aerators so formed are disposed in series and have their ends interconnected by flexible sections of said air supply conduit.

4. Apparatus according to claim 1, characterized in that said air supply conduit (26) forms said carrier.

5. Apparatus according to claim 1, characterized in that said carrier is composed of serially connected sections of said air supply conduit (26), at least one of said sections being flexible in itself.

6. Apparatus according to claim 1, characterized in that said carrier (25) is alterable in length.

7. Apparatus according to claim 1, characterized by an outlet (11) having a calmed zone provided adjacent said outlet 11, an inlet 7, and a sludge recirculation duct (20) extending from said calmed zone to a position adjacent said inlet (7).

8. Apparatus according to claim 7, characterized in that said outlet is formed as a floating overflow (41) with controllable flow-through.

9. Apparatus according to claim 8, characterized in that the floating overflow (41) is disposed above a sludge collecting trough (34), and a floating partition wall (42) is located laterally of said overflow towards the center of said basin.

10. Apparatus according to claim 7, characterized in that a sludge collector trough (34) is provided at a portion of said basin (3, 4) remote from said inlet (7), the intake end of said sludge recirculation duct (20) being located at the bottom of said trough.

11. Apparatus according to claim 10, characterized in that the intake portion of said sludge recirculation duct (20) is formed as a tube provided with sludge intake openings (37).

12. Apparatus according to claim 11, characterized in that said sludge collector trough (34) is disposed transversely of the longitudinal extension of said carrier (25) in a calmed zone of said basin (3, 4) outside the range of movement of said bottom aerators (24).

13. Apparatus according to claim 10, characterized in that said sludge collecting trough (34) has a V-shaped cross-section with legs of different length, the lower portion of said trough containing the intake portion of said sludge recirculation duct (20) extending at a lower elevation than the bottom (33) of said basin, the shorter leg of said V-shape forming the connection to said bottom.

14. Apparatus according to claim 13, characterized in that a sweeper device (40) is provided above said sludge collecting trough (34) for sweeping said trough and intake openings (37) of said sludge recirculation duct.

15. Apparatus according to claim 12, characterized in that air exit openings (43) are provided adjacent said sludge collecting trough for aerating and agitating the collected sludge.

16. Apparatus according to claim 7, characterized in that said sludge recirculation duct is provided with an air injector (39) for conveying and aerating the active sludge.

17. Apparatus according to claim 1, characterized in that the ends of said carrier (25) are attached at stationary anchoring points.

18. Apparatus according to claim 1, characterized in that the ends of said carrier are movably attached to guide means (49, 53) extending transversely of the longitudinal extension of said carrier.

19. Apparatus according to claim 18, characterized in that said guide means are in the form of guide ropes (49) to which said carrier is attached so as to be movable therealong, and possibly detachable.

20. Apparatus according to claim 1, characterized in that the ends of said carrier (25) are attached to carriages (52) adapted for movement transversely of the longitudinal extension of said carrier.

21. Apparatus according to claim 20, characterized in that said carriages (52) are movable along rails (53) disposed transversely of the longitudinal extension of said carrier.

22. Apparatus according to claim 1 wherein said aeration means has float means operatively associated therewith.

23. Apparatus according to claim 22 wherein said float means is mounted at spaced intervals along said aeration means.

24. Apparatus according to claim 22, characterized in that said bottom aerators are provided at their upper ends with a float (31) extending along the longitudinal extension of said carrier.

25. Apparatus according to claim 22, characterized in that said air supply conduit (26) forms said float means (31).

26. Apparatus according to claim 22, characterized in that said float means (31) is formed by a cylindrical float body coaxially surrounding said air supply conduit.

* * * * *